US012776915B2

(12) United States Patent
Jin et al.

(10) Patent No.: US 12,776,915 B2
(45) Date of Patent: Oct. 27, 2026

(54) STORAGE DEVICE, OPERATING METHOD OF CONTROLLER, AND SYSTEM

(71) Applicant: Samsung Electronics Co., Ltd., Suwon-si (KR)

(72) Inventors: Sunghyun Jin, Suwon-si (KR); Mungyu Bae, Suwon-si (KR); Sungho Yoon, Suwon-si (KR); Jisoo Kim, Suwon-si (KR); Younsung Chu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 18/750,245

(22) Filed: Jun. 21, 2024

(65) Prior Publication Data

US 2025/0211448 A1 Jun. 26, 2025

(30) Foreign Application Priority Data

Dec. 20, 2023 (KR) ........................ 10-2023-0187516

(51) Int. Cl.
*H04L 29/06* (2006.01)
*H04L 9/14* (2006.01)
*H04L 9/32* (2006.01)

(52) U.S. Cl.
CPC .............. *H04L 9/3242* (2013.01); *H04L 9/14* (2013.01)

(58) Field of Classification Search
CPC ....... H04L 9/3242; H04L 9/14; H04L 9/3247; H04L 9/3271; H04L 9/0825; G06F 21/79; G06F 21/46; G06F 21/64
See application file for complete search history.

(56) References Cited

U.S. PATENT DOCUMENTS

| | | | | |
|---|---|---|---|---|
| 8,214,630 | B2 | 7/2012 | Peterka et al. | |
| 8,438,621 | B2 * | 5/2013 | Zhang | G06F 21/335 713/172 |
| 9,450,947 | B2 * | 9/2016 | Messerges | H04L 63/0823 |
| 9,633,185 | B2 * | 4/2017 | Shin | G06F 21/602 |
| 9,723,007 | B2 | 8/2017 | Burch et al. | |
| 2022/0027519 | A1 * | 1/2022 | Kataria | H04L 63/10 |
| 2023/0229816 | A1 * | 7/2023 | Chaudhary | G06F 21/602 713/193 |

FOREIGN PATENT DOCUMENTS

| | | | |
|---|---|---|---|
| JP | 2022-107344 | A | 7/2022 |
| KR | 10-2228454 | B1 | 3/2021 |

* cited by examiner

*Primary Examiner* — Harunur Rashid
(74) *Attorney, Agent, or Firm* — Fish & Richardson P.C.

(57) ABSTRACT

A storage device, an operating method of a controller, and a system. The storage device configured to perform a Secure Joint Test Action Group (JTAG) authentication based on token history information including a history of a number of times of use of at least one token, a hash value, and a temporary digital signature. Temporary authentication information includes a temporary token comprising a token identifier and a maximum count indicating a maximum number of times the temporary token is permitted to be used, a public key of an authentication server, a temporary public key and a temporary private key corresponding to the storage device, and a temporary digital signature generated for temporary public keys and the temporary token, the temporary digital signature generated based on a private key of the authentication server paired with the public key.

7 Claims, 12 Drawing Sheets

FIG. 5

TOKEN_history

| | DEVICE ID | MAX COUNT | TOKEN ID | USE COUNT |
|---|---|---|---|---|
| 0 | 1 | 5 | AAAAA | 1 |
| 1 | 1 | 3 | BBBBBB | 3 |
| 2 | 1 | 2 | CCCCCC | 1 |
| 3 | | | | |

FIG. 6

TOKEN_t_1

| DEVICE ID | MAX COUNT | TOKEN ID |
|---|---|---|
| 1 | 3 | BBBBBB |

TOKEN_history

| | DEVICE ID | MAX COUNT | TOKEN ID | USE COUNT |
|---|---|---|---|---|
| 0 | 1 | 5 | AAAAA | 1 |
| 1 | 1 | 3 | BBBBBB | 3 |
| 2 | 1 | 2 | CCCCCC | 1 |
| 3 | | | | |

REJECT

FIG. 7

TOKEN_t_2

| DEVICE ID | MAX COUNT | TOKEN ID |
|---|---|---|
| 1 | 2 | CCCCCC |

↓

TOKEN_history

| | DEVICE ID | MAX COUNT | TOKEN ID | USE COUNT |
|---|---|---|---|---|
| 0 | 1 | 5 | AAAAA | 1 |
| 1 | 1 | 3 | BBBBBB | 3 |
| 2 | 1 | 2 | CCCCCC | 1 |
| 3 | | | | |

↓

TOKEN_history_updated

| | DEVICE ID | MAX COUNT | TOKEN ID | USE COUNT |
|---|---|---|---|---|
| 0 | 1 | 5 | AAAAA | 1 |
| 1 | 1 | 3 | BBBBBB | 3 |
| 2 | 1 | 2 | CCCCCC | 1→2 |
| 3 | | | | |

↓

APPROVE

FIG. 8

TOKEN_t_3

| DEVICE ID | MAX COUNT | TOKEN ID |
|---|---|---|
| 1 | 6 | DDDDD |

TOKEN_history

| | DEVICE ID | MAX COUNT | TOKEN ID | USE COUNT |
|---|---|---|---|---|
| 0 | 1 | 5 | AAAAA | 1 |
| 1 | 1 | 3 | BBBBBB | 3 |
| 2 | 1 | 2 | CCCCCC | 1 |
| 3 | | | | |

TOKEN_history_updated

| | DEVICE ID | MAX COUNT | TOKEN ID | USE COUNT |
|---|---|---|---|---|
| 0 | 1 | 5 | AAAAA | 1 |
| 1 | 1 | 3 | BBBBBB | 3 |
| 2 | 1 | 2 | CCCCCC | 1 |
| 3 | 1 | 6 | DDDDD | 1 |

APPROVE

FIG. 9

TOKEN_t_2

| DEVICE ID | MAX COUNT | TOKEN ID |
|---|---|---|
| 1 | 2 | CCCCCC |

↓

TOKEN_history

| | DEVICE ID | MAX COUNT | TOKEN ID |
|---|---|---|---|
| 0 | 1 | 5 | AAAAA |
| 1 | 1 | 3 | BBBBBB |
| 2 | 1 | 2 | CCCCCC |
| 3 | | | |

↓

TOKEN_history_updated

| | DEVICE ID | MAX COUNT | TOKEN ID |
|---|---|---|---|
| 0 | 1 | 5 | AAAAA |
| 1 | 1 | 3 | BBBBBB |
| 2 | 1 | 2→1 | CCCCCC |
| 3 | | | |

↓

APPROVE

STORAGE DEVICE, OPERATING METHOD OF CONTROLLER, AND SYSTEM

CROSS-REFERENCE TO RELATED APPLICATION

This application claims priority under 35 U.S.C. § 119 to Korean Patent Application No. 10-2023-0187516, filed on Dec. 20, 2023, in the Korean Intellectual Property Office, the disclosure of which is incorporated by reference herein in its entirety.

BACKGROUND

The inventive concepts relate to electronic devices, and more particularly to, storage devices, operating methods of controllers, and systems that are configured to protect storage devices from malicious attackers and enhancing the security of the storage devices.

Semiconductor memory devices may be classified into a volatile type such as dynamic random access memory (DRAM) and static random access memory (SRAM), and a non-volatile type such as electrically erasable programmable read only memory (EEPROM), ferroelectric random access memory (FRAM), phase changer random access memory (PRAM), magnetic random access memory (MRAM), and flash memory. Volatile memory devices lose data stored therein when power is turned off, while non-volatile memory devices retain data stored therein even when power is turned off.

Devices that use non-volatile memory include, for example, MP3 players, digital cameras, cellular phones, camcorders, flash cards, and solid state disks (SSDs), but are not limited thereto. The number of devices using non-volatile memory as a storage device has increased, and along with this, the capacity of non-volatile memory has also rapidly increased.

A debugging device may execute an authentication program to perform a debugging operation on a storage device including non-volatile memory. For example, the debugging device may request Secure Joint Test Action Group (JTAG) authentication from a storage device. However, when the authentication program is hijacked by a malicious attacker, secret information stored in the storage device may be leaked. Therefore, research is underway to increase the security of storage devices.

SUMMARY

The inventive concepts provide storage devices, operating methods of a controller, and systems configured to protect storage devices from malicious attackers and enhance security of the storage devices, even when authentication program are hijacked.

According to some example embodiments, there is provided a storage device comprising a one-time programmable (OTP) memory configured to store a hash value; a non-volatile memory configured to store token history information including a history of a number of times of use of at least one token; and a memory controller configured to receive temporary authentication information, the temporary authentication information including a temporary token comprising a token identifier and a maximum count indicating a maximum number of times the temporary token is permitted to be used, a public key of an authentication server, a temporary public key and a temporary private key corresponding to the storage device, and a temporary digital signature generated for the temporary public key and the temporary token, the temporary digital signature generated based on a private key of the authentication server paired with the public key, verify the public key based on the hash value, check whether each of the temporary token and the temporary public key is valid by verifying the temporary digital signature, based on the verified public key and a digital signature algorithm, and determine whether to use the temporary public key, based on the temporary token that is valid and the token history information.

According to some example embodiments, there is provided an operating method of a controller. The operating method comprising receiving temporary authentication information embedded in a computing device, the temporary authentication information including a public key of an authentication server and a temporary public key for the controller, a temporary token comprising a device identifier that specifies the controller, a maximum count, and a token identifier, and a temporary digital signature generated based on a private key paired with the public key of the authentication server, the temporary public key, and the temporary token; verifying the temporary authentication information based on a digital signature algorithm and token history information including a history of a number of times of use of at least one token; and performing debugging of a Secure Joint Test Action Group (JTAG) by performing a challenge-response protocol through the challenge-response protocol based on results of the verifying.

According to some example embodiments, there is provided a system comprising a computing device and a semiconductor device. The computing device is configured to execute an authentication program including temporary authentication information. The temporary authentication information including a temporary token comprising a token identifier and a maximum count indicating a maximum number of times the temporary token is permitted to be used, a public key of an authentication server, a temporary public key and a temporary private key corresponding to the semiconductor device, and a temporary digital signature generated for the temporary public key and the temporary token, the temporary digital signature generated based on a private key of the authentication server paired with the public key. The semiconductor device is configured to store a hash value and token history information including a history of a number of times of use of at least one token, and perform a Secure JTAG authentication based on the token history information, the hash value, and the temporary digital signature.

BRIEF DESCRIPTION OF THE DRAWINGS

Example embodiments will be more clearly understood from the following detailed description taken in conjunction with the accompanying drawings in which:

FIG. 5 is a diagram illustrating token history information according to some example embodiments;

FIG. 6 is a diagram illustrating an example of rejecting a Secure Joint Test Action Group (JTAG) authentication based on token history information according to some example embodiments;

FIGS. 7, 8, and 9 are diagrams illustrating examples of approving Secure JTAG authentications based on token history information according to some example embodiments;

DETAILED DESCRIPTION

Hereinafter, some example embodiments will be described with reference to the accompanying drawings.

Figure 1:
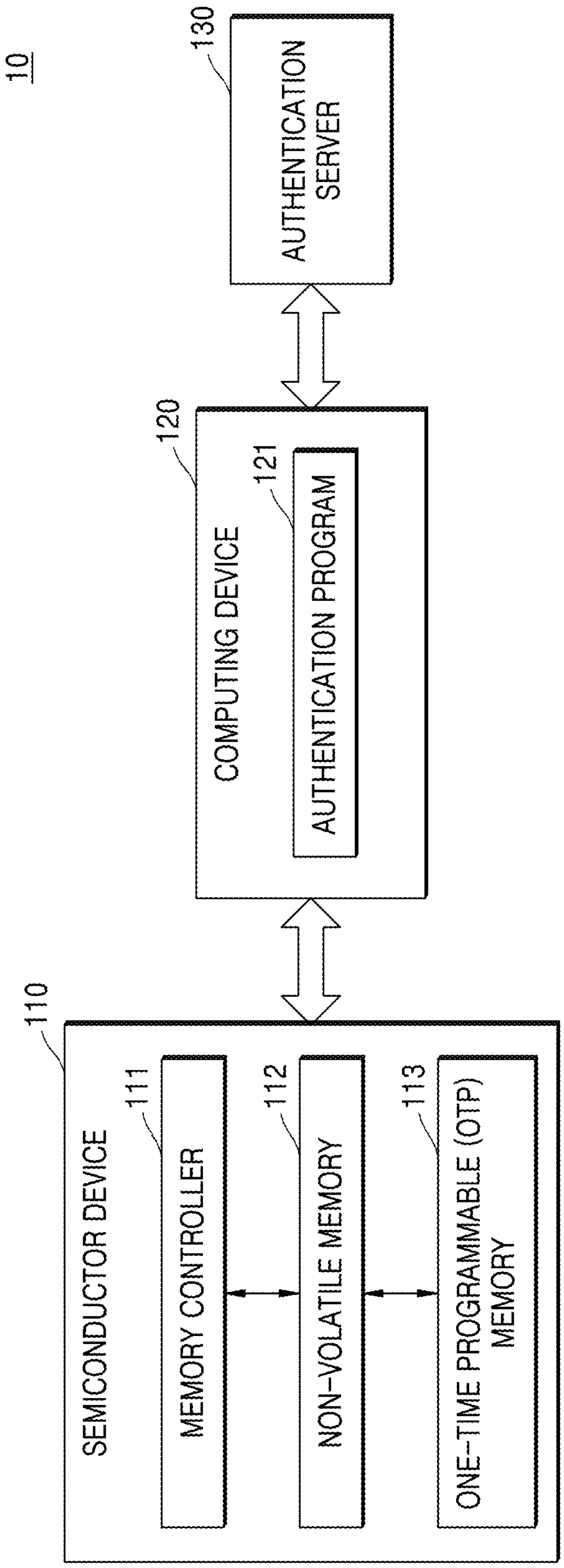
FIG. 1 is a block diagram illustrating a system according to some example embodiments.

FIG. 1 is a block diagram illustrating a system 10 according to some example embodiments.

Referring to FIG. 1, the system 10 may include a semiconductor device 110, a computing device 120, and an authentication server 130.

The semiconductor device 110 may perform debug authentication on the computing device 120 that is authenticated and may communicate with the authenticated computing device 120 for a debugging operation. According to some example embodiments, debug authentication methods include a password authentication and a challenge-response protocol. The challenge-response protocol uses a public key cryptosystem.

In some example embodiments, the semiconductor device 110 may be implemented as a storage device. The semiconductor device 110 may include a memory controller 111, a non-volatile memory 112, and a one-time programmable (OTP) memory 113.

In some example embodiments, when the memory controller 111 receives a debugging request signal from the computing device 120, power may be supplied to the memory controller 111 for a debugging operation. The memory controller 111 may receive a debugging request signal from the computing device 120 through a Joint Test Action Group (JTAG) interface. The memory controller 111 may receive a JTAG signal through a plurality of pins. For example, the memory controller 111 may receive a test-data-in (TDI) signal, a test clock (TCK) signal, a test reset (TRST) signal, and a test mode select (TMS) signal through a TDI pin, a TCK pin, a TRST pin, and a TMS pin. A test-data-out (TDO) signal processed by the memory controller 111 may be output to the computing device 120 through a TDO pin.

In some example embodiments, the memory controller 111 may receive temporary authentication information from the computing device 120. The memory controller 111 may verify a public key included in the temporary authentication information based on a hash value stored in the OTP memory 113. Once the public key is verified, the memory controller 111 may verify a temporary digital signature included in the temporary authentication information based on the verified public key and a digital signature algorithm to check the validity of each of a temporary token and a temporary public key that are included in the temporary authentication information. In some example embodiments, when the temporary token and the temporary public key are valid, the memory controller 111 may determine whether to proceed with a challenge-response protocol based on the verified temporary token and token history information stored in the non-volatile memory 112.

The non-volatile memory 112 may include a plurality of memory cells. In some example embodiments, the memory cells may be NAND flash memory cells. However, the inventive concepts are not limited thereto, and in some example embodiments, the memory cells may be resistive memory cells such as resistive random access memory (ReRAM) cells, phase change random access memory (PRAM) cells, or magnetic random access memory (MRAM) cells. The non-volatile memory 112 may store the token history information. The token history information may refer to information on the history of at least one token, for example, the use history of at least one token.

The OTP memory 113 may store at least one hash value.

The computing device 120 may be referred to as a debugging device or debugger. The computing device 120 may receive a public key and a private key of the authentication server 130 from the authentication server 130. The computing device 120 may execute an authentication program 121 to generate a public key of the authentication server 130 and generate a digital signature using a random number and a private key of the authentication server 130. In some example embodiments, the computing device 120 may receive from the authentication server 130, a temporary public key, a temporary private key, a temporary digital signature, and a temporary token for the semiconductor device 110. In some example embodiments, when the computing device 120 and the authentication server 130 are able to communicate with each other, the computing device 120 may receive temporary authentication information including a public key, a temporary public key, a temporary token, and a temporary digital signature from the authentication server 130 and may execute the authentication program 121 to transfer the temporary authentication information to the semiconductor device 110. In some example embodiments, when the computing device 120 and the authentication server 130 are unable to communicate with each other, the computing device 120 may embed temporary authentication information into the authentication program 121. The computing device 120 may receive a random number from the semiconductor device 110, generate a digital signature based on the random number and a temporary private key, and transmit or send the digital signature to the semiconductor device 110. The computing device 120 may perform a challenge-response protocol together with the semiconductor device 110 to perform Secure JTAG debugging through the challenge-response protocol. Secure JTAG may refer to a device security mechanism that enables the computing device 120 to perform JTAG communication only when it is possible to authenticate the computing device 120 using secret information through the challenge-response protocol. For example, in the challenge-response protocol used in Secure JTAG, techniques using passwords, symmetric key cryptography, and public key cryptography may be possible, and techniques using public key cryptography may be the most secure.

The authentication server 130 may generate a public key and a private key. The authentication server 130 may generate a temporary public key and a temporary private key for each of semiconductor devices 110. The temporary public key and the temporary private key may be unique information for each of semiconductor devices 110. For example, when an identifier of the semiconductor device 110 is changed, the temporary public key and the temporary private key generated for the semiconductor device 110 may also be changed. The authentication server 130 may generate a temporary token for each of semiconductor devices 110. The temporary token may include an identifier of the semiconductor device 110, a maximum count, and an identifier of a token. For example, the maximum count may refer to the maximum number of times the temporary token may be used in the semiconductor device 110. The authentication server 130 may generate a temporary digital signature corresponding to the semiconductor device 110, based on a private key, a temporary public key, a temporary token, and a digital signature algorithm. The authentication server 130 may include hardware such as a hardware security module (HSM). The HSM may be an enhanced tamper-proof hardware device configured to protect encryption processes by generating, protecting, and managing keys used to encrypt and decrypt data and generating digital signatures and certificates. The HSM may be tested, verified, and certified according to high-level security standards including FIPS 140-2 and Common Criteria. The HSM may generate a random number using hardware noise as a source.

According to some example embodiments, the security of different semiconductor devices 110 may be enhanced and secured even when the authentication program 121 is hijacked, and threats from computing devices 120 running the hijacked authentication program 121 may be removed and limited.

Figure 2:
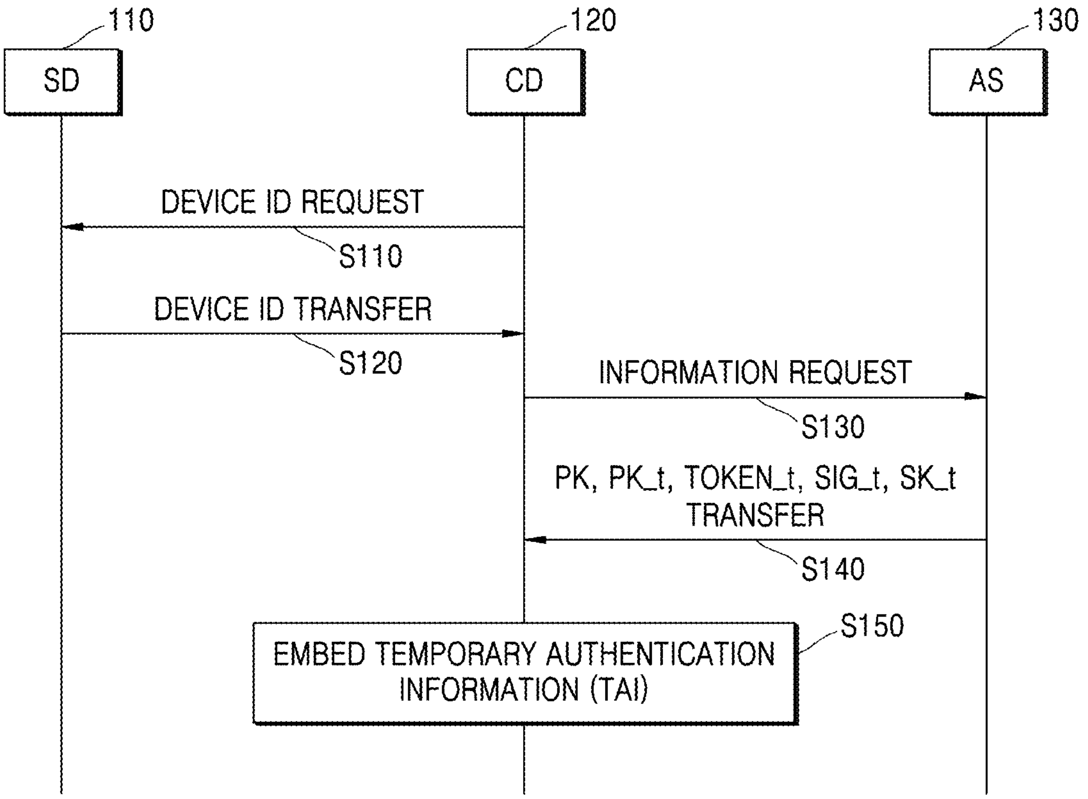
FIG. 2 is a ladder diagram illustrating an example of generating temporary authentication information according to some example embodiments.

FIG. 2 is a ladder diagram illustrating an example of generating temporary authentication information according to some example embodiments.

Referring to FIG. 2, the computing device 120 may request a device identifier DEVICE ID from the semiconductor device 110 (S110). The semiconductor device 110 may transmit, transfer, or send the device identifier DEVICE ID of the semiconductor device 110 to the computing device 120 in response to the device identifier request (S120). The computing device 120 may connect to the authentication server 130 by a computed authentication method, transmit or send a device identifier to be debugged to the authentication server 130, and request the authentication server 130 for information necessary for performing an authentication procedure on a device to be debugged (S130). The authentication server 130 may transmit, transfer, or send, to the computing device 120, a public key PK, a temporary public key PK_t for the semiconductor device 110, a temporary token TOKEN_t for the semiconductor device 110, a temporary digital signature SIG_t for the semiconductor device 110, and a temporary private key SK_t for the semiconductor device 110 (S140). For example, a digital signature algorithm may be selected. The digital signature algorithm may be a public key cryptography-based algorithm to be used for a Secure JTAG challenge-response protocol. Examples of the digital signature algorithm may include a Ron Rivest, Adi Shamir, Leonard Adleman (RSA) encryption algorithm, an elliptic curve digital signature algorithm (ECDSA), and post-quantum cryptography (PQC), and any one of the examples may be selected as the digital signature algorithm, but example embodiments are not limited thereto. Once the digital signature algorithm is determined, the authentication server 130 may generate a key pair including a public key PK and a private key of the digital signature algorithm to be used in the specific semiconductor device, for example, the semiconductor device 110. The authentication server 130 may provide the public key PK and a method by which the authentication program 121 may identify the key pair. The private key may be embedded in the authentication program 121 when the computing device 120 executing the authentication program 121 is unable to communicate with the authentication server 130. The authentication server 130 may receive the device identifier DEVICE ID and generate a temporary key pair including a temporary public key PK_t and a temporary private key SK_t for the semiconductor device 110 and may generate a temporary token TOKEN_t for the semiconductor device 110. The temporary key pair may refer to a password of which the number of uses is limited for each of semiconductor devices 110. The authentication server 130 may generate a temporary digital signature SIG_t for the temporary public key PK_t and the temporary token TOKEN_t by using a private key. According to some example embodiments, temporary authentication information TAI may include a public key PK, a temporary public key PK_t, a temporary token TOKEN_t, and a temporary digital signature SIG_t. The temporary token TOKEN_t may include a device identifier that specifies the semiconductor device 110, the maximum number of times of use of a temporary key pair, a token identifier that specifies the temporary key pair and/or a token, or the like. Issued information is embedded in the authentication program 121.

For Secure JTAG authentication in environments in which communication is restricted, the computing device 120 may receive, from the authentication server 130, temporary authentication information TAI on the semiconductor device 110 that is a device with which the computing device 120 is to communicate, and may embed the temporary authentication information TAI therein (S150).

In some example embodiments, communication between the computing device 120 and the authentication server 130 may be impossible, not possible, or reduced. In some example embodiments, when communication between the computing device 120 and the authentication server 130 may not be possible or when communication is reduced, the computing device 120 may embed, into the authentication program 121, temporary authentication information TAI on each of semiconductor devices 110.

Figure 3:
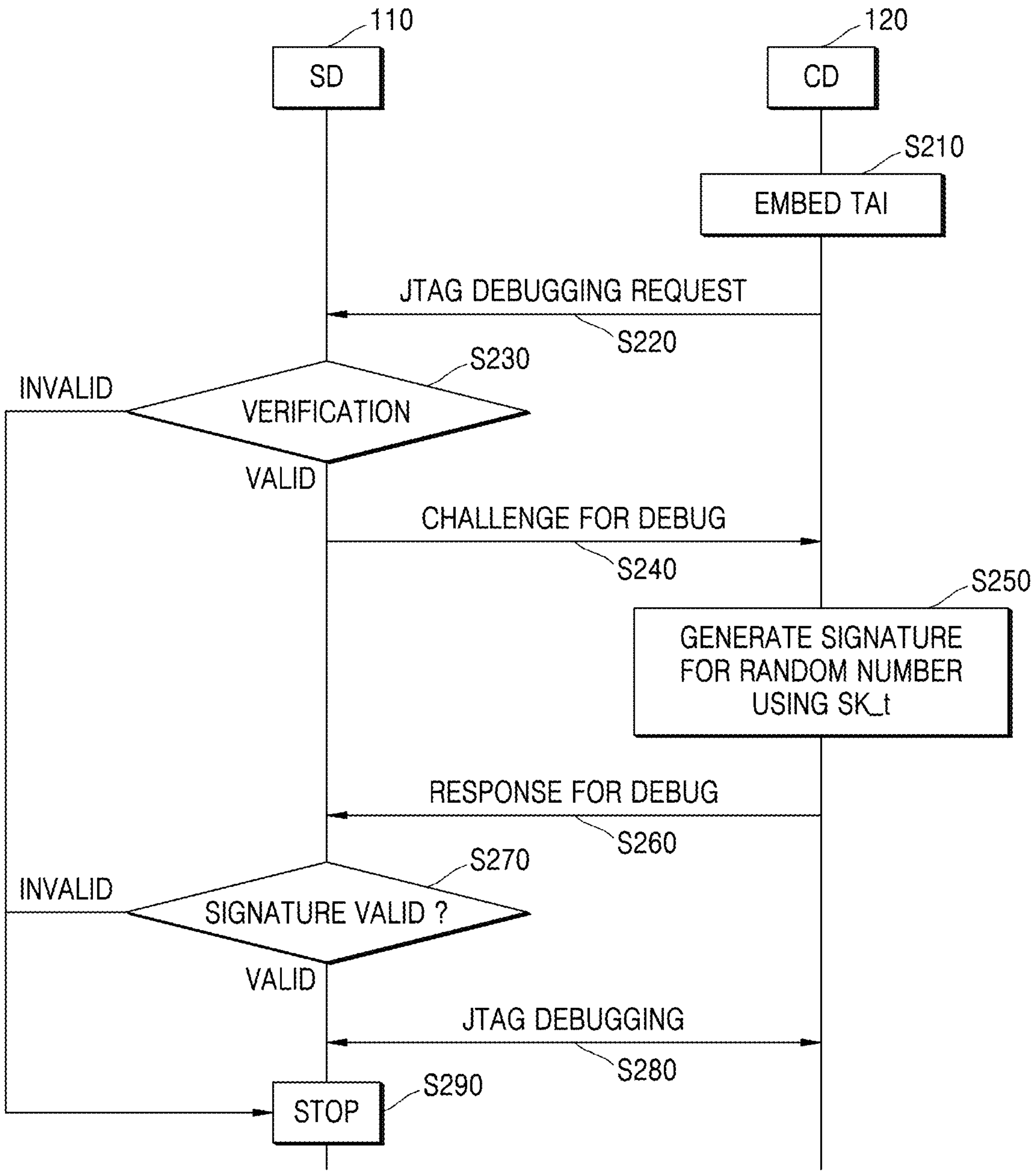
FIG. 3 is a ladder diagram illustrating an example of authenticating a challenge-response protocol according to some example embodiments.

FIG. 3 is a ladder diagram illustrating an example of authenticating a challenge-response protocol according to some example embodiments.

Referring to FIG. 3, the computing device 120 may embed temporary authentication information TAI in the authentication program 121 for each of semiconductor devices 110 (S210). The computing device 120 may transmit or send a JTAG debugging request to the semiconductor device 110 (S220). For example, the computing device 120 may deliver, transfer, or send, to the semiconductor device 110, the temporary authentication information TAI provided from the authentication program 121 using a device identifier DEVICE ID. The temporary authentication information TAI may include a public key of the authentication server 130, a temporary public key, a temporary token, and a digital signature prepared using a private key of the authentication server 130 for the temporary public key and the temporary token. The semiconductor device 110 may use the temporary authentication information TAI received from the computing device 120 to verify whether an authentication request of the computing device 120 is legitimately received from the computing device 120 (S230). The semiconductor device 110 may include a verification system that is implemented using hardware, software, or firmware for verifying requests. An example of operation S230, according to some example embodiments, is described below with reference to FIG. 4. When the authentication request of the computing device 120 is verified as invalid (null) (S230), the debug authentication protocol stops, and the semiconductor device 110 may reject a Secure JTAG authentication (S290). When the authentication request of the computing device 120 is verified as valid (S230), the semiconductor device 110 may transmit or send a challenge for debug to the computing device 120 (S240). In some example embodiments, the challenge may include a random number. For example, the semiconductor device 110 may request a digital signature from the computing device 120 for the challenge including the random number. The computing device 120 may generate a digital signature for the random number of the challenge by using a temporary private key through the authentication program 121 (S250). The computing device 120 may transmit or send a response for debug to the semiconductor device 110 (S260). For example, the computing device 120 may transmit or send the generated digital signature to the semiconductor device 110. The semiconductor device 110 may verify, using a previously received temporary public key PK_t, whether the digital signature is valid (S270). Through the verification of the digital signature, the semiconductor device 110 may verify that the computing device 120 may be authenticated with valid secret information. When the digital signature is verified as invalid (null) (S270), the debug authentication protocol stops (S290). When the digital signature is verified as valid (S270), a JTAG debugging operation may be performed between the semiconductor device 110 and the computing device 120. For example, the semiconductor device 110 may transmit or send an acknowledge signal to the computing device 120 and assign authority corresponding to access control to the computing device 120. The computing device 120 that has received the acknowledge signal may access the semiconductor device 110 and perform a security debugging operation. After the security debugging operation ends, the computing device 120 may transmit or send an access termination signal to the semiconductor device 110.

According to some example embodiments, security is enhanced by embedding temporary authentication information in an environment in which it is difficult for the authentication server 130 and the authentication program 121 to communicate with each other during a Secure JTAG authentication operation.

Figure 4:
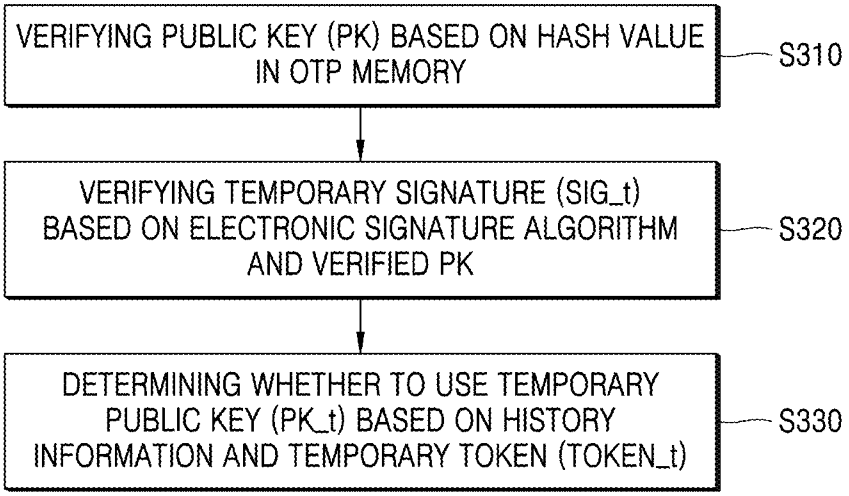
FIG. 4 is a flowchart illustrating a verification operation based on temporary authentication information according to some example embodiments.

FIG. 4 is a flowchart illustrating a verification operation based on temporary authentication information according to some example embodiments.

Referring to FIG. 4, the memory controller 111 may verify a public key PK of the authentication server 130 based on a hash value stored in the OTP memory 113 (S310). In some example embodiments, the memory controller 111 may compare the hash value to the public key PK and verify the public key based on results of the comparison. For example, the memory controller 111 may verify the public key PK by comparing the hash value with a value of the public key PK to determine whether the value of the public key PK is valid. In operation S310, when the value of the public key PK is invalid, a debug authentication protocol stops and the memory controller 111 may reject a Secure JTAG authentication. In operation S310, when the value of the public key PK is valid, operation S320 is performed.

The memory controller 111 may verify a temporary digital signature SIG_t, based on the verified public key PK and a digital signature algorithm (S320). For example, the memory controller 111 may verify the temporary digital signature SIG_t according to the digital signature algorithm using the value of the verified public key PK to check whether values of a temporary token TOKEN_t and a temporary public key PK_t are valid. In some example embodiments, the digital signature algorithm may be one of an RSA encryption algorithm, an ECDSA, and PQC, but example embodiments are not limited thereto. In operation S320, when the temporary digital signature SIG_t is invalid, the values of the temporary token TOKEN_t and the temporary public key PK_t are invalid. Thus, the debug authentication protocol stops and the memory controller 111 may reject the Secure JTAG authentication. In operation S320, when the temporary digital signature SIG_t is valid, the values of the temporary token TOKEN_t and the temporary public key PK_t are valid, and thus, operation S330 is performed.

The memory controller 111 may determine, based on token history information and the temporary token TOKEN_t, whether to use the temporary public key PK_t that is currently received (S330). For example, the memory controller 111 may check the remaining number of uses of the currently received temporary token TOKEN_t by referring to a token history of token history information stored in the non-volatile memory 112. In some example embodiments, when the remaining number of uses is not zero, the memory controller 111 may determine to use the currently received temporary public key PK_t. In some example embodiments, when the remaining number of uses is zero, the memory controller 111 may determine not to use the currently received temporary public key PK_t and reject the Secure JTAG authentication, and the debug authentication protocol may stop.

FIG. 5 is a diagram illustrating token history information according to some example embodiments.

Referring to FIG. 5, the non-volatile memory 112 may store a history indicating the number of times a valid token has been used. In some example embodiments, the non-volatile memory 112 may store token history information TOKEN_history. The token history information TOKEN_history may include a history of at least one token. For example, referring to FIG. 5, a use history of a first token may be stored at an address 0 of the token history information TOKEN_history, a use history of a second token may be stored at an address 1 of the token history information TOKEN_history, a use history of a third token may be stored at an address 2 of the token history information TOKEN_history, and an address 3 of the token history information TOKEN_history may be empty. However, example embodiments are not limited thereto. In some example embodiments, the total size of the token history information TOKEN_history may be different from the address range including addresses 0, 1, 2, and 3 and shown in FIG. 5, and the number of stored tokens may also be different from the number of stored tokens in the example shown in FIG. 5.

The token history information TOKEN_history may include information about stored tokens and information about a use count USE COUNT indicating the current number of times of use of each token. The information about stored tokens may include, for example, a device identifier DEVICE ID, a maximum count MAX COUNT, and a token identifier TOKEN ID. The maximum count MAX COUNT may refer to the maximum number of times each token may be used in a device. For example, the first token, the second token, and the third token are stored in the non-volatile memory 112, and thus, the device identifiers DEVICE ID of the first token, the second token, and the third token may be the same (for example, '1'). The maximum counts MAX COUNT of the first token, second token, and third token may be '5', '3', and '2', respectively. The token identifiers TOKEN ID of the first token, second token, and third token may be 'AAAAA', 'BBBBBB', and 'CCCCCC', respectively.

In some example embodiments, a temporary token having the same identifier as the identifier of any one of the tokens stored in the token history information TOKEN_history may be provided to the semiconductor device 110.

In some example embodiments, the memory controller 111 may check whether the use count USE COUNT of a corresponding token exceeds the maximum count MAX COUNT of the corresponding token, and based on results of the checking, the memory controller 111 may perform an authentication process through a Secure JTAG public key cryptography-based challenge-response protocol using a temporary public key PK_t or may reject a Secure JTAG authentication. The semiconductor device 110 protects the token history information TOKEN_history to use the token history information TOKEN_history when verifying the number of times a temporary public key PK_t has been used. For example, the memory controller 111 may encrypt the token history information TOKEN_history to prevent attackers from understanding or modifying the token history information TOKEN_history and may apply a restriction method to the token history information TOKEN_history to prevent attackers from abusing the token history information TOKEN_history, even when the token history information TOKEN_history is modified.

FIG. 5 illustrates that the device identifiers DEVICE ID are included in the token history information TOKEN_history, but example embodiments are not limited thereto. In some example embodiments, the device identifiers DEVICE ID may be verified in a token verification operation, and because an operation of transmitting/sending and receiving the identifier of the semiconductor device 110 is performed in advance as shown in FIG. 2, the device identifiers DEVICE ID may be omitted from the token history information TOKEN_history.

According to some example embodiments, even when the authentication program 121 for Secure JTAG containing secret information is stolen in a situation in which the computing device 120 is unable to access the authentication server 130, the security of the semiconductor device 110 may be guaranteed.

FIG. 6 is a diagram illustrating an example of rejecting a Secure JTAG authentication based on token history information according to some example embodiments.

Referring to FIG. 6, a first temporary token TOKEN_t_1 may be provided to the semiconductor device 110. A device identifier DEVICE ID, a maximum count MAX COUNT, and a token identifier TOKEN ID of the first temporary token TOKEN_t_1 may be '1', '3', and 'BBBBBB', respectively.

The memory controller 111 may search token history information TOKEN_history for a token corresponding to the first temporary token TOKEN_t_1 by using the token identifier TOKEN ID of the first temporary token TOKEN_t_1. For example, because a token identifier TOKEN ID of a second token stored at an address 1 of the token history information TOKEN_history is the same as the token identifier TOKEN ID of the first temporary token TOKEN_t_1, the second token stored at the address 1 of the token history information TOKEN_history may be found.

The memory controller 111 may determine whether a use count USE COUNT of the found token is less than a maximum count MAX COUNT of the found token. Alternatively, in some example embodiments, the memory controller 111 may determine whether the use count USE COUNT of the found token is equal to the maximum count MAX COUNT of the found token. For example, the use count USE COUNT of the second token may be equal to the maximum count MAX COUNT of the second token. In some example embodiments, the memory controller 111 may reject a Secure JTAG authentication.

FIGS. 7, 8, and 9 are diagrams illustrating examples of approving Secure JTAG authentications based on token history information according to some example embodiments.

Referring to FIG. 7, a second temporary token TOKEN_t_2 may be provided to the semiconductor device 110. A device identifier DEVICE ID, a maximum count MAX COUNT, and a token identifier TOKEN ID of the second temporary token TOKEN_t_2 may be '1', '2', and 'CCCCCC', respectively. A third token stored at an address 2 of the token history information TOKEN_history may have the same token identifier TOKEN ID as the token identifier TOKEN ID of the second temporary token TOKEN_t_2. Because a use count USE COUNT of the third token is less than a maximum count MAX COUNT of the third token, the second temporary token TOKEN_t_2 may be used. The memory controller 111 may update the token history information TOKEN_history by changing the use count USE COUNT of a corresponding token. For example, the use count USE COUNT stored at the address 2 of the token history information TOKEN_history may be changed from '1' to '2'. In some example embodiments, the memory controller 111 may encrypt a value to be updated and store the updated token history information TOKEN_history_updated in the non-volatile memory 112. When the token history information TOKEN_history is updated as the use count USE COUNT of a corresponding token is changed, the memory controller 111 may approve a Secure JTAG authentication. Then, debugging of Secure JTAG may be performed through a challenge-response protocol.

Referring to FIG. 8, a device identifier DEVICE ID, a maximum count MAX COUNT, and a token identifier TOKEN ID of a third temporary token TOKEN_t_3 provided to the semiconductor device 110 are '1', '6', and 'DDDDD', respectively. A token having the same token identifier TOKEN ID as the token identifier TOKEN ID of the third temporary token TOKEN_t_3 may not be found in token history information TOKEN_history. Accordingly, in some example embodiments, the memory controller 111 may use the third temporary token TOKEN_t_3 and update the token history information TOKEN_history by adding information about the third temporary token TOKEN_t_3 to the token history information TOKEN_history. For example, the device identifier DEVICE ID, the maximum count MAX COUNT, and the token identifier TOKEN ID of the third temporary token TOKEN_t_3 may be stored at an address 3 of the token history information TOKEN_history. In some example embodiments, a use count USE COUNT of the third temporary token TOKEN_t_3 may be generated and stored as '1' at the address 3 of the token history information TOKEN_history. In some example embodiments, the updated token history information TOKEN_history_updated may be encrypted and stored in the non-volatile memory 112. When the token history information TOKEN_history is updated, a Secure JTAG authentication is approved, and debugging of Secure JTAG may be performed through a challenge-response protocol.

Unlike in the example embodiments shown in FIGS. 5 to 8, in some example embodiments, such as shown in FIG. 9, token history information TOKEN_history may not contain information indicating use counts USE COUNT of tokens. Accordingly, in some example embodiments, the memory controller 111 may update the token history information TOKEN_history by decreasing the value of the maximum count MAX COUNT of each token found in the token history information TOKEN_history. For example, when a second temporary token TOKEN_t_2 is provided to the semiconductor device 110, because the maximum count MAX COUNT stored at an address 2 of the token history information TOKEN_history is '2', the second temporary token TOKEN_t_2 may be used. Then, the memory controller 111 may update the token history information TOKEN_history by decreasing the value of the maximum count MAX COUNT stored at the address 2 of the token history information TOKEN_history from '2' to '1' and may approve a Secure JTAG authentication. In some example embodiments, the memory controller 111 may control the non-volatile memory 112 to encrypt the second temporary token TOKEN_t_2 and store the encrypted second temporary token TOKEN_t_2. In some example embodiments, the second temporary token TOKEN_t_2 may be provided to the semiconductor device 110 once again, and for example, the value of the maximum count MAX COUNT stored at the address 2 of the token history information TOKEN_history may be decreased from '1' to '0'. In some example embodiments, when the second temporary token TOKEN_t_2 is provided to the semiconductor device 110 once more, the second temporary token TOKEN_t_2 may not be used.

According to some example embodiments, the security of the semiconductor device 110 may be enhanced, and resources of the non-volatile memory 112 may be saved.

Figure 10:
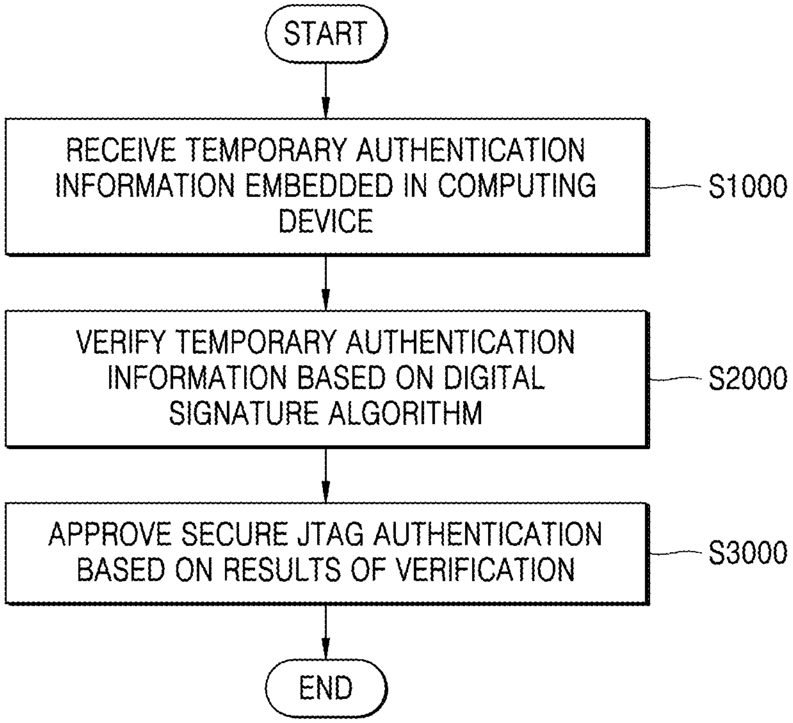
FIG. 10 is a flowchart illustrating an operating method of a controller according to some example embodiments.

FIG. 10 is a flowchart illustrating an operating method of a controller according to some example embodiments.

Referring to FIGS. 1 and 10, the operating method shown in FIG. 10 may be performed by the memory controller 111 based on Secure JTAG and may include receiving temporary authentication information TAI embedded in the computing device 120 (S1000), verifying the temporary authentication information TAI based on a digital signature algorithm (S2000), and approving a Secure JTAG authentication based on results of the verifying (S3000). The temporary authentication information TAI may include: a public key of the authentication server 130; a temporary public key PK_t for the memory controller 111; a temporary token including a device identifier DEVICE ID specifying the memory controller 111, a maximum count MAX COUNT, and a token identifier TOKEN ID; and a temporary digital signature SIG_t generated based on a private key SK forming a pair with the public key PK of the authentication server 130, the temporary public key PK_t, and the temporary token TOKEN_t.

In some example embodiments, operation S2000 may include operation S310, operation S320, and operation S330.

Figure 11:
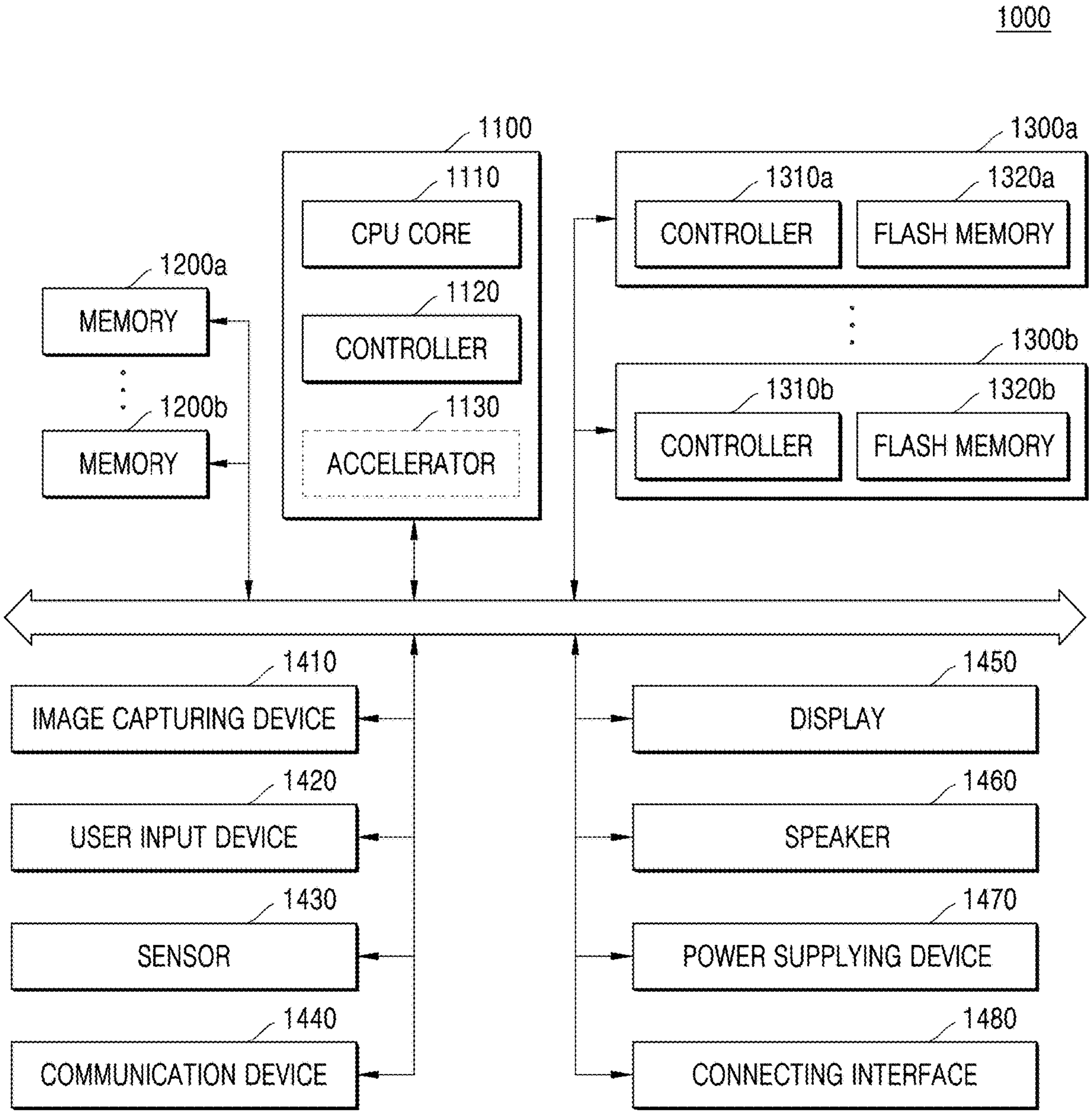
FIG. 11 is a diagram illustrating an electronic system according to some example embodiments.

FIG. 11 is a diagram illustrating an electronic system 1000 according to some example embodiments.

Referring to FIG. 11, the system 1000 may include a mobile system, such as, but not limited to, a portable communication terminal (e.g., a mobile phone), a smartphone, a tablet personal computer (PC), a wearable device, a healthcare device, or an Internet of things (IoT) device. However, the system 1000 is not limited to the mobile system and may include another electronic device, such as, but not limited to, a PC, a laptop computer, a server, a media player, or an automotive device (e.g., a navigation device).

The system 1000 may include a main processor 1100, memories **1200*a* and 1200*b*, and storage devices 1300*a* and 1300*b*. Alternatively or additionally, in some example embodiments, the system 1000 may include at least one of an image capturing device 1410, a user input device 1420, a sensor 1430, a communication device 1440, a display 1450, a speaker 1460, a power supplying device 1470, and a connecting interface 1480**.

The main processor 1100 may control the operations of the system 1000. Alternatively or additionally, in some example embodiments, the main processor 1100 may control operations of other components included in the system 1000. The main processor 1100 may be implemented as a general-purpose processor, a dedicated processor, and/or an application processor.

The main processor 1100 may include at least one central processing unit (CPU) core 1110 and further include a controller 1120 configured to control the memories **1200*a* and 1200*b* and/or the storage devices 1300*a* and 1300*b*. In some example embodiments, the main processor 1100 may further include an accelerator 1130, which may include a dedicated circuit for a high-speed data operation, such as, but not limited to, an artificial intelligence (AI) data operation. For example, the accelerator 1130 may include a graphics processing unit (GPU), a neural processing unit (NPU) and/or a data processing unit (DPU) and/or be implemented as a chip that is physically separated from the other components of the main processor 1100**.

In some example embodiments, the main processor 1100 may be corresponding to the computing device 120 of FIG. 1. The main processor 1100 may execute the authentication program 120 comprising temporary authentication information. The main processor 1100 may communicate with the storage devices **1300*a* and 1300*b* for the debugging operation. Some example embodiments of the present inventive concepts may be applied to the main processor 1100**.

The memories **1200*a* and 1200*b* may be used as main memory devices of the system 1000. Each of the memories 1200*a* and 1200*b* may include a volatile memory, such as, but not limited to, static random access memory (SRAM) and/or dynamic random access memory (DRAM), and/or a non-volatile memory, such as, but not limited to, a flash memory, phase-change RAM (PRAM), and/or resistive random access memory (RRAM). In some example embodiments, the memories 1200*a* and 1200*b* may be implemented in the same package as the main processor 1100**.

The storage devices **1300*a* and 1300*b* may serve as non-volatile storage devices configured to store data regardless of whether power is supplied thereto, and may have a larger storage capacity than the memories 1200*a* and 1200*b*. The storage devices 1300*a* and 1300*b* may respectively include storage controllers 1310*a* and 1310*b* and flash memories 1320*a* and 1320*b* and be configured to store data via the control of the storage controllers 1310*a* and 1310*b*. Although the flash memories 1320*a* and 1320*b* may include vertical NAND (V-NAND) flash memories having a two-dimensional (2D) structure or a three-dimensional (3D) structure, the flash memories 1320*a* and 1320*b*** may include other types of non-volatile memories (NVMs), such as PRAM and/or RRAM.

The storage devices **1300*a* and 1300*b* may be physically separated from the main processor 1100 and be included in the system 1000 and/or implemented in the same package as the main processor 1100. Alternatively, or additionally, in some example embodiments, the storage devices 1300*a* and 1300*b* may have types of SSDs or memory cards and may be removably combined with other components of the system 1000 through an interface, such as a connecting interface 1480 that is described below. The storage devices 1300*a* and 1300*b*** may be devices to which a standard protocol, such as, but not limited to, UFS, eMMC, NVMe, and the like may be applied, without being limited in this regard.

In some example embodiments, the storage devices 1300*a* and 1300*b* may be corresponding to the semiconductor device 110 of FIG. 1 respectively. The storage devices 1300*a* and 1300*b* may perform debug authentication on the main processor 1100 and communicate with the main processor 1100 for the debugging operation. Some example embodiments of the present inventive concepts may be applied to the storage devices 1300*a* and 1300*b*. The storage controllers 1310*a* and 1310*b* may be corresponding to the memory controller 111 included in the semiconductor device 110 of FIG. 1 respectively. The storage devices 1300*a* and 1300*b* may further include the OTP memory 113 of FIG. 1.

The image capturing device 1410 may capture still images and/or moving images. The image capturing device 1410 may include, but not be limited to, a camera, a camcorder, and/or a webcam. The user input device 1420 may receive various types of data input by a user of the system 1000 and may include, but not be limited to, a touch pad, a keypad, a keyboard, a mouse, and a microphone. The sensor 1430 may detect various types of physical quantities, which may be obtained from the outside of the system 1000, and convert the detected physical quantities into electric signals. For example, the sensor 1430 may include, but not be limited to, a temperature sensor, a pressure sensor, an illuminance sensor, a position sensor, an acceleration sensor, a biosensor, and/or a gyroscope sensor. The communication device 1440 may transmit and/or receive signals between other devices outside the system 1000, according to various communication protocols. The communication device 1440 may include, but not be limited to, an antenna, a transceiver, and/or a modem.

The display 1450 and the speaker 1460 may serve as output devices configured to respectively output visual information and auditory information to the user of the system 1000. The power supplying device 1470 may appropriately convert power supplied from a battery (not shown) embedded in the system 1000 and/or an external power source and supply the converted power to each of components of the system 1000. The connecting interface 1480 may provide connection between the system 1000 and an external device, which may be connected to the system 1000 and capable of transmitting and/or receiving data to and/or from the system 1000. The connecting interface 1480 may be implemented by using various interface schemes, such as, but not limited to, ATA, SATA, e-SATA, SCSI, SAS, PCI, PCIe, NVMe, Fire Wire, a USB interface, a SD card interface, an MMC interface, an eMMC interface, a UFS interface, an embedded UFS (eUFS) interface, and a CF card interface.

Figure 12:
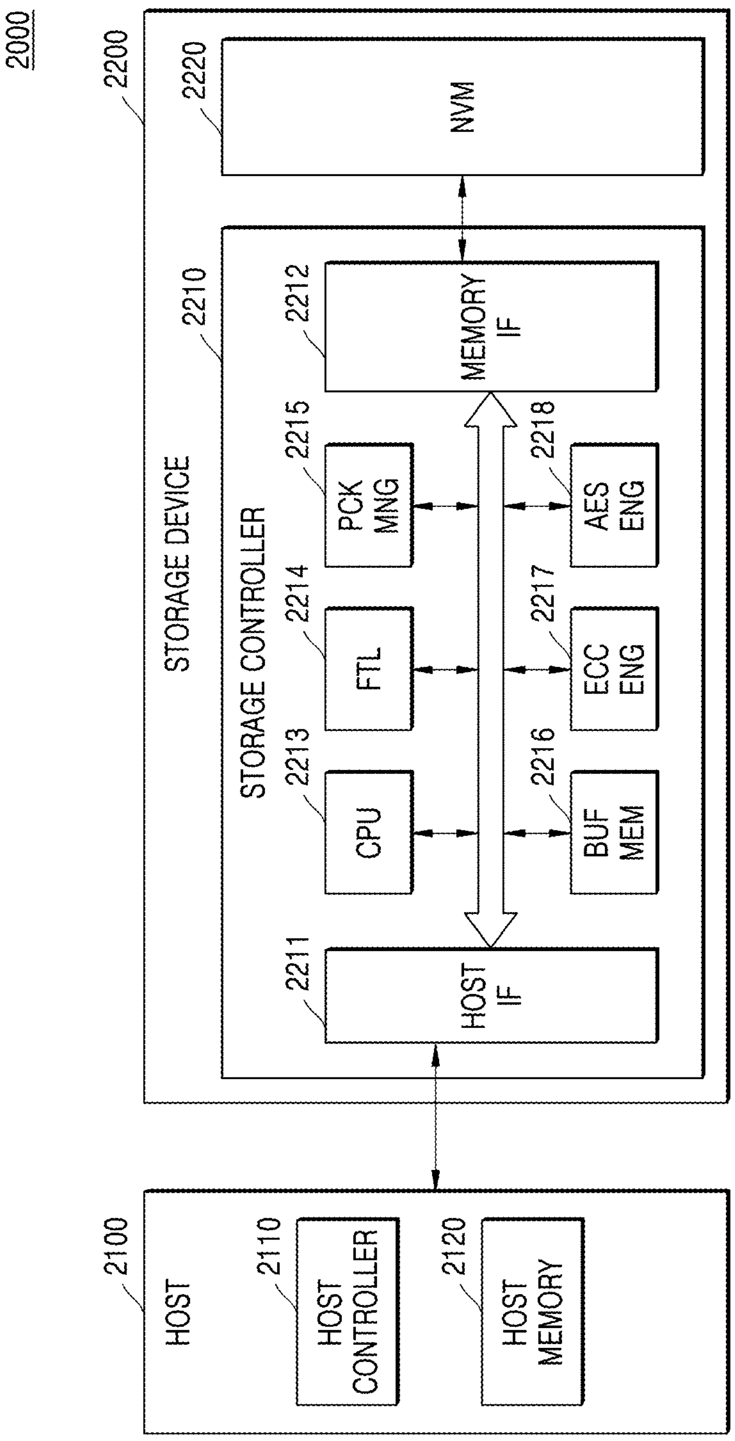
FIG. 12 is a block diagram illustrating an interface of a storage system according to some example embodiments.

FIG. 12 is a block diagram illustrating an interface of a storage system 2000 according to some example embodiments.

Referring to FIG. 12, the storage system 2000 may include a host 2100 and a storage device 2200. In some example embodiments, the storage device 2200 may include a storage controller 2210 and a non-volatile memory (e.g., NVM 2220). In some example embodiments, the host 2100 may include a host controller 2110 and a host memory 2120. The host memory 2120 may serve as a buffer memory configured to temporarily store data to be transmitted, sent, or transferred to the storage device 2200 and/or data transmitted, transferred, or sent from the storage device 2200.

The storage device 2200 may include storage media configured to store data in response to requests from the host 2100. For example, the storage device 2200 may include at least one of an SSD, an embedded memory, and a detachable external memory. When the storage device 2200 is the SSD, the storage device 2200 may be a device that conforms to an NVMe standard, for example. Alternatively, or additionally, in some example embodiments, when the storage device 2200 is an embedded memory or an external memory, the storage device 2200 may be a device that conforms to a UFS standard or an eMMC standard. Each of the host 2100 and the storage device 2200 may generate a packet according to an adopted standard protocol and transmit the packet.

When the NVM 2220 of the storage device 2200 may include a flash memory, the flash memory may include a 2D NAND memory array or a 3D (or vertical) NAND (VNAND) memory array. Alternatively, or additionally, in some example embodiments, the storage device 2200 may include various other types of non-volatile memories. For example, the storage device 2200 may include, but not be limited to, MRAM, spin-transfer torque MRAM (STT-MRAM), conductive bridging RAM (CBRAM), ferroelectric RAM (FRAM), PRAM, and RRAM.

In some example embodiments, the storage device 2200 may be corresponding to the semiconductor device 110 of FIG. 1 and some example embodiments of the present inventive concepts may be applied to the storage device 2200.

According to some example embodiments, the host controller 2110 and the host memory 2120 may be implemented as separate semiconductor chips. Alternatively or additionally, in some example embodiments, the host controller 2110 and the host memory 2120 may be integrated into the same semiconductor chip. For example, the host controller 2110 may include any one of a plurality of modules included in an application processor. For another example, the application processor may be implemented as a System on Chip (SoC). Alternatively or additionally, in some example embodiments, the host memory 2120 may be an embedded memory included in the application processor or a non-volatile memory or a memory module, which may be outside the application processor.

The host controller 2110 may manage an operation of storing data (e.g., write data) of a buffer region of the host memory 2120 in the non-volatile memory 2220 and/or storing data (e.g., read data) of the non-volatile memory 2220 in the buffer region.

The storage controller 2210 may include a host interface 2211, a memory interface 2212, and a CPU 2213. In an embodiment, the storage controller 2210 may further include a flash translation layer (FTL) 2214, a packet manager 2215, a buffer memory 2216, an ECC engine 2217, and an advanced encryption standard (AES) engine 2218. The storage controller 2210 may further include a working memory (not shown) in which the FTL 2214 is loaded. The CPU 2213 may execute the FTL 2214 to control write and read operations on the NVM 2220.

The host interface 2211 may transmit, send, transfer and/or receive packets to and/or from the host 2100. A packet transmitted, transferred, or sent from the host 2100 to the host interface 2211 may include a command and/or data to be written the non-volatile memory 2220. A packet transmitted, transferred, or sent from the host interface 2211 to the host 2100 may include a response to the command and/or data read from the non-volatile memory 2220. The memory interface 2212 may transmit, transfer, or send data to be written to the non-volatile memory 2220 and/or receive data read from the non-volatile memory 2220. The memory interface 2212 may be configured to comply with one or more standard protocols, such as, but not limited to, Toggle and/or open NAND flash interface (ONFI).

The FTL 2214 may perform various functions, such as, but not limited to, an address mapping operation, a wear-leveling operation, and a garbage collection operation. The address mapping operation may refer to an operation of converting a logical address received from the host 2100 into a physical address used to physically store data in the non-volatile memory 2220. The wear-leveling operation may refer to a technique for preventing excessive deterioration of a specific block by allowing blocks of the non-volatile memory 2220 to be uniformly used. For example, the wear-leveling operation may be implemented using a firmware technique that balances erase counts of physical blocks. The garbage collection operation may refer to a technique for ensuring usable capacity in the non-volatile memory 2220 by erasing an existing block after copying valid data of the existing block to a new block.

The packet manager 2215 may generate a packet according to a protocol of an interface, which interfaces with the host 2100, and/or parse various types of information from the packet received from the host 2100. Alternatively, or additionally, in some example embodiments, the buffer memory 2216 may temporarily store data to be written to the NVM 2220 and/or data to be read from the NVM 2220. Although, in some example embodiments, the buffer memory 2216 may be a component included in the storage controllers 2210, the buffer memory 2216 may be outside the storage controllers 2210.

The ECC engine 2217 may perform error detection and correction operations on read data read from the NVM 2220. For example, the ECC engine 2217 may generate parity bits for write data to be written to the NVM 2220, and the generated parity bits may be stored in the NVM 2220 together with write data. During the reading of data from the NVM 2220, the ECC engine 2217 may correct an error in the read data by using the parity bits read from the NVM 2220 along with the read data, and output error-corrected read data.

The AES engine 2218 may perform, by using a symmetric-key algorithm, at least one of an encryption operation and a decryption operation on data input to the storage controllers 2210.

It is apparent to those skilled in the art that the example embodiments of the present inventive concepts may be modified or changed in various ways without departing from the scope or technical spirit of the inventive concept. Thus, such modifications or changes made within the scope of the following claims and equivalents thereof are included in the scope of the present inventive concepts.

While the present inventive concepts have been particularly shown and described with reference to some example embodiments thereof, it will be understood that various changes in form and details may be made therein without departing from the spirit and scope of the following claims.

What is claimed is:

1. A storage device, comprising:

a one-time programmable (OTP) memory configured to store a hash value;

a non-volatile memory configured to store token history information including a history of a number of times of use of at least one token; and a memory controller configured to receive temporary authentication information, the temporary authentication information including a temporary token comprising a token identifier and a maximum count indicating a maximum number of times the temporary token is permitted to be used, a public key of an authentication server, a temporary public key and a temporary private key corresponding to the storage device, and a temporary digital signature generated for the temporary public key and the temporary token, the temporary digital signature generated based on a private key of the authentication server paired with the public key, verify the public key based on the hash value, check whether each of the temporary token and the temporary public key is valid by verifying the temporary digital signature based on the verified public key and a digital signature algorithm, retrieve the token identifier of the temporary token from the token history information; and determine whether to use the temporary public key, based on the temporary token that is valid and the maximum count of a token retrieved from the token history information.

2. The storage device of claim 1, wherein the memory controller is further configured to verify the public key based on the hash value and the public key.

3. The storage device of claim 1, wherein the memory controller is further configured to, when the maximum count of the retrieved token is not zero, determine to use the temporary public key, send a challenge comprising a random number to a computing device, and update the token history information by decreasing the maximum count of the retrieved token, and wherein the memory controller is further configured to, when the maximum count of the retrieved token is zero, reject a Secure Joint Test Action Group (JTAG) authentication.

4. The storage device of claim 1, wherein the token history information further includes information indicating a use count corresponding to a number of times of use of each of the at least one token, wherein the memory controller is further configured to, when the use count of the retrieved token is less than the maximum count of the retrieved token, determine to use the temporary public key, send a challenge comprising a random number to a computing device, and update the token history information by increasing the use count of the retrieved token, and wherein the memory controller is further configured to, when the use count of the retrieved token is equal to the maximum count of the retrieved token, reject a Secure JTAG authentication.

5. The storage device of claim 1, wherein the memory controller is further configured to, when the token identifier of the temporary token is not retrieved from the token history information, determine to use the temporary public key, send a challenge comprising a random number to a computing device, and update the token history information by storing the temporary token in a non-volatile memory.

6. The storage device of claim 5, wherein the memory controller is further configured to control the non-volatile memory to encrypt the temporary token and store the encrypted temporary token.

7. The storage device of claim 1, wherein the memory controller is further configured to, when determining to use the temporary public key, receive a digital signature generated based on the temporary private key corresponding to the storage device; and verify the digital signature based on the temporary public key that is verified and the digital signature algorithm.

* * * * *